(12) United States Patent
Chen (10) Patent No.: US 11,093,598 B2
(45) Date of Patent: Aug. 17, 2021

(54) IDENTITY AUTHENTICATION METHOD AND APPARATUS

(71) Applicant: Huawei Technologies Co., Ltd., Shenzhen (CN)

(72) Inventor: Guozhong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/020,458

(22) Filed: Jun. 27, 2018

(65) Prior Publication Data

US 2018/0309756 A1   Oct. 25, 2018

Related U.S. Application Data

(63) Continuation of application No. PCT/CN2016/090515, filed on Jul. 19, 2016.

(30) Foreign Application Priority Data

Dec. 28, 2015   (CN) .......................... 201511000452.0

(51) Int. Cl.
*G06F 21/00*   (2013.01)
*H04L 29/04*   (2006.01)
(Continued)

(52) U.S. Cl.
CPC ................ *G06F 21/41* (2013.01); *H04L 9/32* (2013.01); *H04L 9/3213* (2013.01);
(Continued)

(58) Field of Classification Search
CPC ............. H04L 63/0876; H04L 63/0807; H04L 63/0815; H04L 63/083; H04L 63/102;
(Continued)

(56) References Cited

U.S. PATENT DOCUMENTS 8,782,411 B2 *   7/2014   Nimashakavi ........ H04L 9/3213
                                                             713/168
9,313,687 B2 *   4/2016   Knutson ............. H04L 61/2015
(Continued)

FOREIGN PATENT DOCUMENTS

CN    101212297 A    7/2008
CN    101442793 A    5/2009
(Continued)

OTHER PUBLICATIONS

Yike Yu, et al., An Identity-Based Authentication Model for Mobile Agent, Oct. 2009, 2009 Fifth International Conference on Information Assurance and Security, pp. 1-4.*
(Continued)

*Primary Examiner* — Lisa C Lewis
(74) *Attorney, Agent, or Firm* — Conley Rose, P.C.

(57) ABSTRACT

An identity authentication method and apparatus, where the method includes receiving a network access request from a user terminal, returning a portal authentication page to the user terminal, where the portal authentication page includes indication information, receiving an access token that is generated by an open social platform and used to obtain user identity information, generating a portal authentication request including a terminal identifier of the user terminal and the access token, sending the portal authentication request to an authentication server, and receiving a portal authentication response returned by the authentication server, where the portal authentication response includes the terminal identifier and an authentication result. Therefore, the identity authentication may be directly performed on the user terminal using the user identity information stored on the open social platform, and a user does not need to register with a portal authentication system in advance.

20 Claims, 4 Drawing Sheets

(51) Int. Cl.
*G06F 21/41* (2013.01)
*H04L 9/32* (2006.01)
*H04L 29/06* (2006.01)
*H04W 12/069* (2021.01)
*H04L 29/08* (2006.01)

(52) U.S. Cl.
CPC ........ *H04L 63/083* (2013.01); *H04L 63/0807* (2013.01); *H04L 63/0815* (2013.01); *H04L 63/0876* (2013.01); *H04L 63/102* (2013.01); *H04L 67/02* (2013.01); *H04W 12/069* (2021.01)

(58) Field of Classification Search
CPC ......... H04L 9/32; H04L 9/3213; H04L 67/02; H04L 63/0884; H04L 63/0853; H04L 63/0823; G06F 21/41; H04W 12/06
See application file for complete search history.

(56) References Cited

U.S. PATENT DOCUMENTS

| | | | |
|---|---|---|---|
| 9,549,318 B2* | 1/2017 | Saunders | H04L 63/0807 |
| 10,033,769 B2* | 7/2018 | Khan | H04L 61/6054 |
| 10,057,249 B2* | 8/2018 | Votaw | H04L 63/0861 |
| 10,122,704 B2* | 11/2018 | Xiu | H04L 67/2814 |
| 10,291,610 B2* | 5/2019 | Chang | G06Q 50/01 |
| 10,505,936 B2* | 12/2019 | Han | H04L 63/083 |
| 10,531,297 B2* | 1/2020 | Wang | H04L 63/108 |
| 2007/0152849 A1* | 7/2007 | McConnell | H04L 41/12 340/963 |
| 2007/0282998 A1* | 12/2007 | Zhu | H04L 12/1403 709/224 |
| 2013/0110922 A1* | 5/2013 | Shih | G06Q 50/01 709/204 |
| 2014/0020073 A1* | 1/2014 | Ronda | G06F 21/44 726/7 |
| 2014/0149194 A1* | 5/2014 | Suganuma | G06Q 30/0214 705/14.16 |
| 2014/0189808 A1* | 7/2014 | Mahaffey | H04L 63/0853 726/4 |
| 2014/0280617 A1* | 9/2014 | Nilsson | H04L 51/32 709/206 |
| 2014/0282972 A1 | 9/2014 | Fan et al. | |
| 2015/0046327 A1* | 2/2015 | Taupitz | G06Q 20/367 705/44 |
| 2015/0295915 A1* | 10/2015 | Xiu | H04L 63/083 726/7 |
| 2015/0319102 A1* | 11/2015 | Esdaile | H04W 48/00 709/225 |
| 2015/0350209 A1* | 12/2015 | Tamura | H04L 63/0884 713/155 |
| 2016/0013985 A1* | 1/2016 | Reddy | H04L 41/5003 726/4 |
| 2016/0065558 A1* | 3/2016 | Suresh | G06F 21/31 726/7 |
| 2016/0119351 A1* | 4/2016 | Tamura | H04L 63/10 726/4 |
| 2016/0219038 A1* | 7/2016 | Stephenson | H04L 63/0884 |
| 2016/0307196 A1* | 10/2016 | Achhra | H04L 63/102 |
| 2018/0150890 A1* | 5/2018 | Gupta | G06Q 30/0609 |
| 2019/0392123 A1* | 12/2019 | Larsen | G06F 21/45 |

FOREIGN PATENT DOCUMENTS

| | | | | |
|---|---|---|---|---|
| CN | 102143177 A | | 8/2011 | |
| CN | 101610156 B | * | 7/2012 | |
| CN | 103428203 A | | 12/2013 | |
| CN | 105530224 A | * | 4/2016 | |
| CN | 106921636 A | * | 7/2017 | ............ G06F 21/41 |
| EP | 2770794 A1 | | 8/2014 | |
| JP | 2016149652 A | * | 8/2016 | |
| WO | WO-2012174959 A1 | * | 12/2012 | ...... H04W 12/04031 |
| WO | 2015050892 A1 | | 4/2015 | |

OTHER PUBLICATIONS

Ying Li, et al., A lightweight identity-based authentication protocol, Aug. 5-8, 2013, 2013 IEEE International Conference on Signal Processing, Communication and Computing (ICSPCC 2013), pp. 1-4.*
Foreign Communication From a Counterpart Application, European Application No. 16880560.4, Extended European Search Report dated Sep. 25, 2018, 8 pages.
Machine Translation and Abstract of Chinese Publication No. CN101212297, Jul. 2, 2008, 12 pages.
Machine Translation and Abstract of Chinese Publication No. CN101442793, May 27, 2009, 15 pages.
Machine Translation and Abstract of Chinese Publication No. CN102143177, Aug. 3, 2011, 12 pages.
Machine Translation and Abstract of Chinese Publication No. CN103428203, Dec. 4, 2013, 53 pages.
Foreign Communication From a Counterpart Application, PCT Application No. PCT/CN2016/090515, English Translation of International Search Report dated Oct. 18, 2016, 2 pages.
Foreign Communication From a Counterpart Application, PCT Application No. PCT/CN2016/090515, English Translation of Written Opinion dated Oct. 18, 2016, 6 pages.

* cited by examiner

IDENTITY AUTHENTICATION METHOD AND APPARATUS

CROSS-REFERENCE TO RELATED APPLICATIONS

This application is a continuation of International Patent Application No. PCT/CN2016/090515 filed on Jul. 19, 2016, which claims priority to Chinese Patent Application No. 201511000452.0 filed on Dec. 28, 2015. The disclosures of the aforementioned applications are hereby incorporated by reference in their entireties.

TECHNICAL FIELD

This application relates to the communications field, and in particular, to an identity authentication method and apparatus.

BACKGROUND

To strengthen security control and operation management on a network, a network provider usually manages network use permission using a portal authentication system. When the network use permission is managed using the portal authentication system, a user terminal can access the network without authentication. However, if the user terminal wants to use the network after accessing the network, the user terminal needs to succeed in identity authentication of the portal authentication system.

When identity authentication is performed on the user terminal, the user terminal needs to provide user identity information of the user terminal to the portal authentication system. The portal authentication system may perform identity authentication on the user terminal using the user identity information in order to determine whether the user terminal has permission to use resources of the network. For example, when identity authentication is performed on the user terminal, the user terminal usually needs to provide a user name and a password for the portal authentication system, and the portal authentication system may perform identity authentication on the user terminal using the user name and the password. If the user terminal can succeed in identity authentication, the portal authentication system may permit the user terminal to use the network managed by the portal authentication system. If the user terminal does not succeed in identity authentication, the portal authentication system may refuse the user terminal to use the network managed by the portal authentication system.

In actual use, the user identity information usually needs to be registered in advance by the user terminal to the portal authentication system, and then can be obtained. Therefore, when needing to use a network, the user terminal needs to register in advance with the portal authentication system that controls network use permission. Because different network providers manage network use permission using different portal authentication systems, when the user terminal needs to use different radio resources, the user terminal needs to register with the different portal authentication systems. This causes inconvenience for use by the user terminal.

SUMMARY

Embodiments of this application provide an identity authentication method and apparatus in order to resolve a problem that an existing portal authentication system is inconvenient for use by a user.

According to a first aspect, an embodiment of this application provides an identity authentication method, where the method includes receiving, by a portal server, a network access request from a user terminal, where the network access request includes a terminal identifier of the user terminal, returning, by the portal server, a portal authentication page to the user terminal, where the portal authentication page includes indication information, and the indication information is used to instruct the user terminal to log in to an open social platform, receiving, by the portal server, an access token that is generated by the open social platform and used to obtain user identity information, generating, by the portal server, a portal authentication request including a terminal identifier of the user terminal and the access token, sending, by the portal server, the portal authentication request to an authentication server such that the authentication server obtains the user identity information from the open social platform according to the terminal identifier and the access token, and performs user identification using the user identity information, and receiving, by the portal server, a portal authentication response returned by the authentication server, where the portal authentication response includes the terminal identifier and an authentication result. When user identity authentication is performed using the method provided in this aspect, the identity authentication may be directly performed on the user terminal using the user identity information of the user terminal stored on the open social platform, and a user does not need to register with a portal authentication system in advance, thereby facilitating use by the user.

With reference to the first aspect, in a first possible implementation of the first aspect, the portal authentication request is a Remote Authentication Dial In User Service (RADIUS) packet, where a user name attribute of the RADIUS packet is the terminal identifier, and a password attribute of the RADIUS packet is the access token. In this implementation, the portal authentication request is transmitted in a form of the RADIUS packet such that security of a process of transmitting the portal authentication request can be improved.

With reference to the first aspect or the first possible implementation of the first aspect, in a second possible implementation of the first aspect, before the receiving, by a portal server, a network access request from a user terminal, the method further includes obtaining, by the portal server, an authorization communications key from the open social platform, where the authorization communications key is used to authorize the authentication server to obtain the information from the open social platform, and sending, by the portal server, the authorization communications key to the authentication server. In this implementation, the portal server can obtain the authorization communications key in advance for the authentication server in order to provide a precondition for obtaining, by the authentication server, the user identity information from the open social platform.

With reference to the first possible implementation of the first aspect, in a third possible implementation of the first aspect, sending, by the portal server, the portal authentication request to an authentication server includes sending, by the portal server, the RADIUS packet to a network access device (NAD), where the RADIUS packet is transparently transmitted to the authentication server using the NAD. In this implementation, the RADIUS packet may be transmitted in a transparent transmission manner such that security of transmission of the authentication request can be improved.

According to a second aspect, an embodiment of this application further provides another identity authentication method, where the method includes receiving, by an authentication server, a portal authentication request sent by a portal server, where the portal authentication request includes a terminal identifier of a user terminal and an access token, and the access token is used to obtain, from an open social platform, user identity information corresponding to the terminal identifier, obtaining, by the authentication server, the user identity information of the user terminal from the open social platform according to the terminal identifier, an authorization communications key, and the access token, where the authorization communications key is used to indicate that the authentication server has permission to obtain the information from the open social platform, performing, by the authentication server, identity authentication on the user terminal using the user identity information, to obtain an authentication result, and returning, by the authentication server, a portal authentication response to the portal server, where the portal authentication response includes the terminal identifier and the authentication result. When user identity authentication is performed using the method provided in this aspect, the identity authentication may be directly performed on the user terminal using the user identity information of the user terminal stored on the open social platform, and a user does not need to register with a portal authentication system in advance, thereby facilitating use by the user.

With reference to the second aspect, in a first possible implementation of the second aspect, the portal authentication request is a RADIUS packet, where a user name attribute of the RADIUS packet is the terminal identifier, and a password attribute of the RADIUS packet is the access token.

With reference to the second aspect or the first possible implementation of the second aspect, in a second possible implementation of the second aspect, before receiving, by an authentication server, a portal authentication request sent by a portal server, the method further includes receiving, by the authentication server, the authorization communications key sent by the portal server.

According to a third aspect, an embodiment of this application further provides an identity authentication apparatus, where the apparatus includes modules configured to perform steps in the foregoing first aspect and implementations of the first aspect.

According to a fourth aspect, an embodiment of this application further provides another identity authentication apparatus, where the apparatus includes modules configured to perform steps in the foregoing second aspect and implementations of the second aspect.

According to a fifth aspect, an embodiment of this application further provides a portal server. The portal server may include a processor, a memory, and a transceiver. The processor communicates with a user terminal, an authentication server, and the like using the transceiver, and the processor is further configured to perform steps in the first aspect and implementations of the first aspect.

According to a sixth aspect, an embodiment of this application further provides an authentication server. The authentication server may include a processor, a memory, and a transceiver. The processor communicates with a user terminal, the portal server, and the like using the transceiver, and the processor is further configured to perform steps in the second aspect and implementations of the second aspect.

According to a seventh aspect, an embodiment of this application further provides an authentication system, where the authentication system may include the foregoing portal server and authentication server, and a NAD. The portal server includes the identity authentication apparatus provided in the third aspect, or is the portal server described in the fifth aspect. The authentication server includes the identity authentication apparatus according to the fourth aspect, or is the authentication server described in the sixth aspect. The NAD is configured to forward a message that is between the portal server and the authentication server.

According to an eighth aspect, an embodiment of this application further provides a computer storage medium, where the computer storage medium stores program code, and the program code includes an instruction for implementing the method of the foregoing first aspect.

According to a ninth aspect, an embodiment of this application further provides another computer storage medium, where the computer storage medium stores program code, and the program code includes an instruction for implementing the method of the foregoing second aspect.

BRIEF DESCRIPTION OF DRAWINGS

To describe technical solutions of embodiments of this application more clearly, the following briefly describes the accompanying drawings required for describing the embodiments. A person of ordinary skill in the art may still derive other drawings from these accompanying drawings without creative efforts.

DESCRIPTION OF EMBODIMENTS

Figure 1:
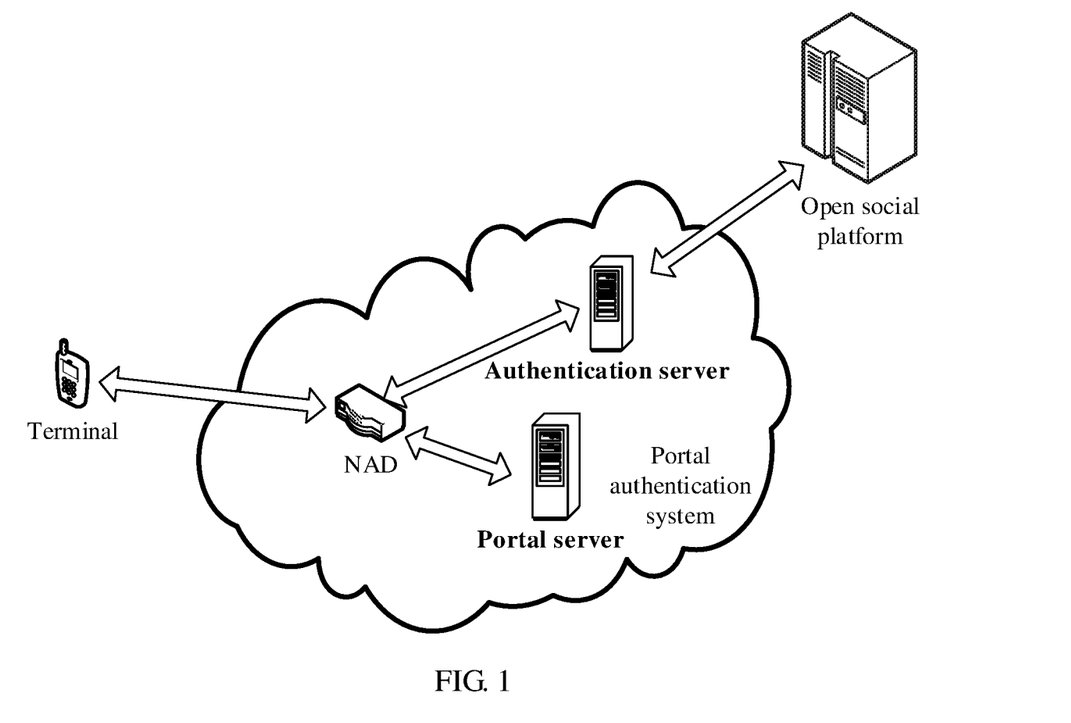
FIG. 1 is a schematic structural diagram of an authentication system according to this application.

Referring to FIG. 1, FIG. 1 is a schematic structural diagram of a portal authentication system according to this application.

As shown in FIG. 1, the authentication system may include a NAD, a portal server, an authentication server, and the like.

The NAD is configured to implement access of a user terminal, and the user terminal may access a network using the NAD. The NAD may be a common network device, such as a switch or a router, or may be a network device dedicated to access authentication, such as a broadband access server (BAS). The authentication server may be an authentication-authorization-accounting (AAA) server.

The user terminal may be a mobile terminal used by a user, for example, a mobile phone or a tablet computer. An open social platform may be an open platform provided by a social network, such as WECHAT, QQ, FACEBOOK, GOOGLE, or TWITTER. An application programming interface (API) or a function provided by the open social platform enables an external program or device to use resources of the software system. In this embodiment of this application, the portal authentication system may access, according to the Open Authorization (oAuth) protocol after being authorized by a user, various information of the user stored on the open social platform.

Figure 2:
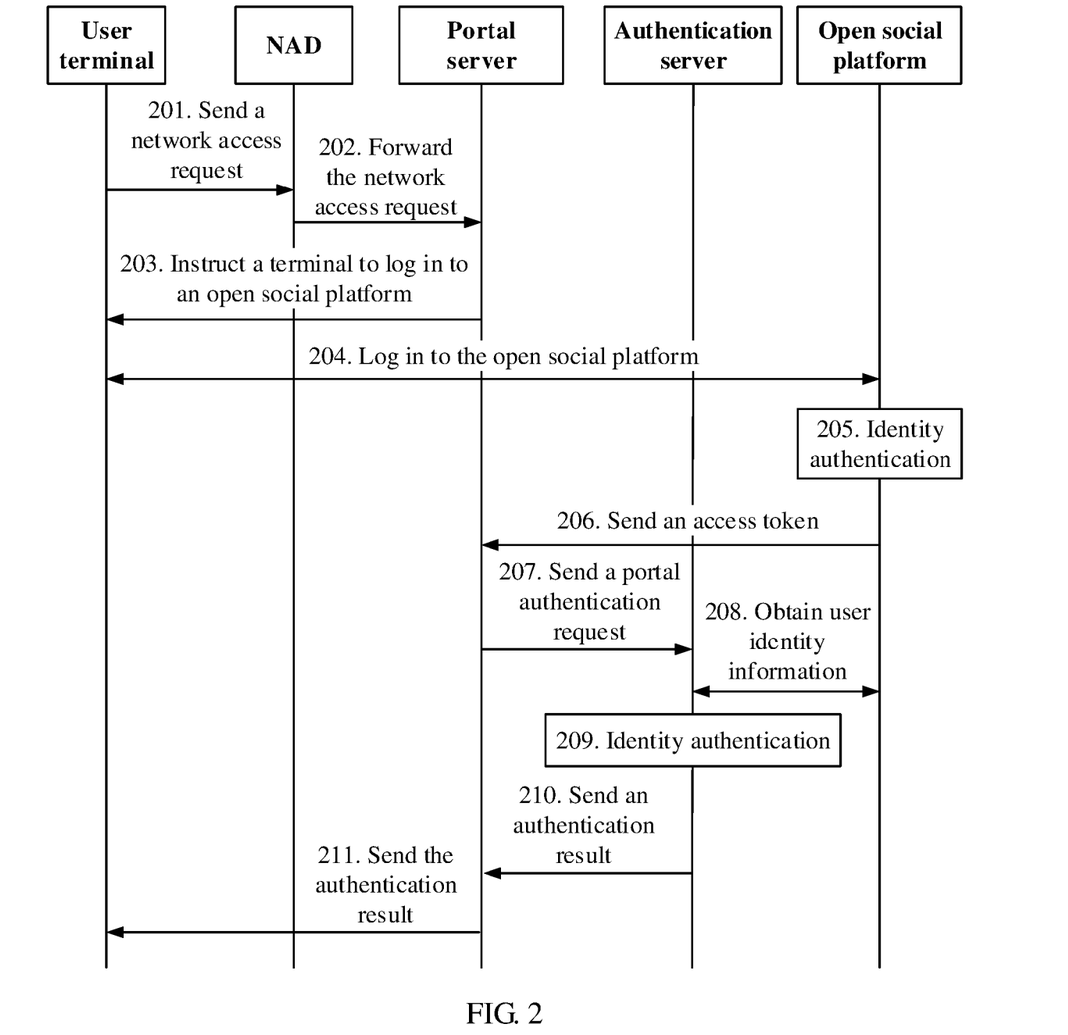
FIG. 2 is a schematic flowchart of an embodiment of an identity authentication method according to this application.

Referring to FIG. 2, FIG. 2 is a schematic flowchart of an embodiment of an identity authentication method according to this application. The identity authentication method of this application is further described below with reference to FIG. 2. It should be noted herein that user identity information mentioned in embodiments of this application is related information that may be used to verify whether a user terminal has permission to use radio resources managed by a portal authentication system.

Step 201: The user terminal sends a network access request after accessing a network using a NAD.

The user terminal may access the NAD in a wired access manner or a wireless access manner in order to access the network. After accessing the network, the user terminal may initiate the network access request. The network access request may be a Hypertext Transfer Protocol (HTTP) request or an HTTP Secure (HTTPS). The HTTP request or the HTTPS request may be used to request to access content in any server of the Internet. Generally, the HTTP request or the HTTPS request may be generated by the user terminal according to a user operation.

Step 202: The NAD intercepts the network access request, and forwards the network access request to a portal server.

Because the user terminal accesses the network using the NAD, the NAD can intercept the network access request sent by the user terminal. After intercepting the network access request, regardless of content of which server in the Internet the network access request originally requests to access, the NAD redirects the network access request to the portal server.

Step 203: After receiving the network access request, the portal server instructs the user terminal to log in to an open social platform.

When the access request is the HTTP request or the HTTPS request, after receiving the network access request, the portal server first establishes a communication connection to the user terminal, and then returns a portal authentication page to the user terminal using the communication connection. The portal authentication page includes indication information used to instruct the user terminal to log in to the open social platform. The indication information may be a link, a button, or the like of an authentication login page of the open social platform. It should be noted herein that, regardless of which content the network access request is used to request, the portal server returns the portal authentication page to the user terminal.

Step 204: The user terminal logs in to the open social platform according to an indication of the portal server.

After receiving the portal authentication page, the user terminal may request to obtain a login page of the open social platform from the open social platform. For example, when a user clicks the link of the authentication login page included in the portal authentication page, the user terminal may send a network access request according to the link, to request to obtain the login page of the open social platform. The NAD may not intercept and redirect the network access request such that the network access request can be sent to the open social platform. After receiving the network access request sent by the user terminal, the open social platform first establishes a communication connection to the user terminal, and then returns the login page of the open social platform to the user terminal using the communication connection. After receiving the login page, the user terminal may display the login page to prompt the user of the user terminal to enter login information to log in to the open social platform. The login information may include information such as a user name and a password that are needed to log in to the open social platform. The operation may be an operation of entering information, such as the user name and the password, registered on the open social platform.

Step 205: The open social platform performs identity authentication on the user terminal using login information.

After receiving the login information, the open social platform performs identity authentication using the login information in order to determine whether the user of the user terminal is a registered user of the open social platform, and further determine whether to generate an access token.

Step 206: The portal server receives an access token sent by the open social platform after the user terminal logs in to the open social platform.

After determining, by means of identity authentication, that the user of the user terminal is the registered user of the open social platform, the open social platform may generate the access token corresponding to the portal authentication system, and send the access token to the portal server. The access token is used to authorize a device, such as an authentication server or the portal server, in the portal authentication system to access information stored on the open social platform, and the open social platform restricts a range of information that can be accessed by the portal control system to user identity information of the user terminal. Refer to related specifications of the oAuth protocol for content included in the access token and a manner of generating the access token. Details are not described herein.

Step 207: The portal server generates a portal authentication request including a terminal identifier of the user terminal and the access token, and sends the portal authentication request to an authentication server.

After receiving the access token, the portal server may generate the portal authentication request, and send the portal authentication request to the NAD.

To ensure security during information transmission between the portal server and an AAA server, when the portal server supports the Extensible Authentication Protocol (EAP), the Tunneled Transport Layer Security (TTLS), and the Password Authentication Protocol (PAP), the portal server may send the portal authentication request to the authentication server using a TLS channel between the portal server and the AAA server. Content included in the portal authentication request may be carried by a RADIUS packet. A user name attribute of the RADIUS packet may be the terminal identifier, and a password attribute of the RADIUS packet may be the access token. The terminal identifier may be the user name used when the user terminal logs in to the open social platform.

After the RADIUS packet is generated, the portal server sends the RADIUS packet to the NAD. After receiving the portal authentication request, the NAD device may transparently transmit the portal authentication request to the authentication server according to specifications of the RADIUS protocol.

Step 208: The authentication server obtains user identity information of the user terminal from the open social platform according to the terminal identifier and the access token.

The authentication server first determines an authorization communications key required for communication between the authentication server and the open social platform, and then obtains the user identity information used to verify an identity of the user terminal from the open social platform according to the terminal identifier, the authorization communications key, and the access token. The authorization communications key and the access token are both released by the open social platform. The authorization communications key is used to indicate that the portal server has permission to obtain information from the open social platform. The access token is used to indicate that the portal server has permission to obtain, from the open social platform, the user identity information corresponding to the terminal identifier of the user terminal. The authorization communications key may be obtained from the open social platform by the authentication server, or may be obtained by the portal server from the open social platform, and then be sent to the authentication server. The portal server may send the authorization communications key to the authentication server using the portal authentication request, or may send the authorization communications key to the authentication server before sending the portal authentication request.

Step 209: The authentication server performs identity authentication on the user terminal using the user identity information to obtain an authentication result.

The authentication server may perform identity authentication on the user terminal according to the user identity information, to obtain the corresponding authentication result.

Step 210: The authentication server returns a portal authentication response to the portal server, where the portal authentication response includes the terminal identifier and the authentication result.

After the authentication result is generated, the authentication server may transparently transmit the terminal identifier and the authentication result to the portal server using the NAD. The user terminal, the NAD, the portal server, and the like may determine, according to the authentication result, whether the user terminal can access a network.

The portal authentication response returned by the authentication server to the portal server includes the terminal identifier and the authentication result such that the portal server can distinguish authentication results corresponding to multiple user terminals when authentication is simultaneously performed on the user terminals.

When the authentication server sends the authentication result to the portal server, the NAD also receives the authentication result. Therefore, if it is determined according to the authentication result that the user terminal has permission to use the network, the NAD may not intercept the network access request of the user terminal, and the user terminal can freely use radio resources, managed by the portal authentication system, to access the network.

Step 211: The portal server returns the authentication result to the user terminal.

After receiving the authentication result, the portal server may return the authentication result to the user terminal such that the user terminal can obtain the authentication result, thereby completing an entire authentication process. The portal server may send the authentication result and the terminal identifier to the NAD, and then the NAD sends the authentication result to the user terminal corresponding to the terminal identifier.

It can be learned from the foregoing embodiment that, the portal authentication system can complete identity authentication on the user terminal using the user identity information stored on the open social platform, and the user terminal does not need to register with the portal authentication system in advance, thereby improving convenience for use by a user.

Figure 3:
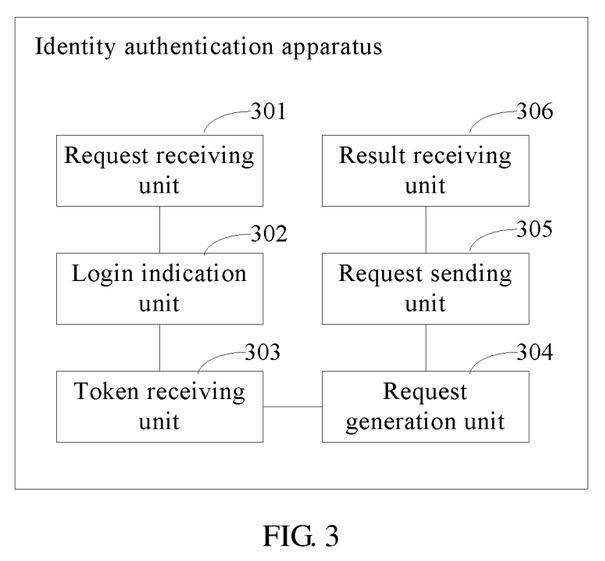
FIG. 3 is a schematic structural diagram of an embodiment of an identity authentication apparatus according to this application.

Referring to FIG. 3, FIG. 3 is a schematic structural diagram of an embodiment of an identity authentication apparatus according to this application. The apparatus may be disposed on a portal server, or may be the portal server itself.

As shown in FIG. 3, the apparatus may include a request receiving unit 301 configured to receive a network access request from a user terminal, where the network access request includes a terminal identifier of the user terminal, a login indication unit 302 configured to return a portal authentication page to the user terminal, where the portal authentication page includes indication information, and the indication information is used to instruct the user terminal to log in to an open social platform, a token receiving unit 303 configured to receive an access token that is generated by the open social platform and used to obtain user identity information, a request generation unit 304 configured to generate a portal authentication request including the terminal identifier of the user terminal and the access token, a request sending unit 305 configured to send the portal authentication request to an authentication server such that the authentication server obtains the user identity information from the open social platform according to the terminal identifier and the access token in the portal authentication request, and performs user identification using the user identity information, and a result receiving unit 306 configured to receive a portal authentication response returned by the authentication server, where the portal authentication response includes the terminal identifier and an authentication result.

The portal authentication request is a RADIUS packet, where a user name attribute of the RADIUS packet is the terminal identifier, and a password attribute of the RADIUS packet is the access token.

Optionally, the apparatus may further include a key obtaining unit (not shown) configured to obtain an authorization communications key from the open social platform, and a key sending unit (not shown) configured to send the authorization communications key to the authentication server. The authorization communications key may be obtained by the key obtaining unit from the open social platform before or after the request receiving unit 301 receives the network access request.

Optionally, the apparatus may further include a result sending unit (not shown) configured to send the authentication result to the user terminal.

Optionally, the result receiving unit 306 is further configured to receive the authentication result forwarded by the NAD, where the authentication result is generated by the authentication server by performing authentication using the user identity information, and sent to the NAD.

Figure 4:
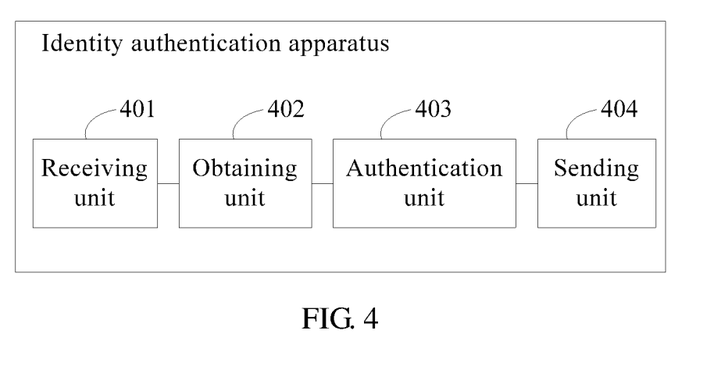
FIG. 4 is a schematic structural diagram of another embodiment of an identity authentication apparatus according to this application.

Referring to FIG. 4, FIG. 4 is a schematic result diagram of an embodiment of an identity authentication apparatus according to this application. The apparatus may be disposed on an authentication server, or may be the authentication server itself.

As shown in FIG. 4, the apparatus may include a receiving unit 401 configured to receive a portal authentication request sent by a portal server, where the portal authentication request includes a terminal identifier of a user terminal and an access token, and the access token is used to indicate that the authentication server has permission to obtain, from an open social platform, user identity information corresponding to the terminal identifier of the user terminal, an obtaining unit 402 configured to obtain the user identity information of the user terminal from the open social platform according to the terminal identifier, an authorization communications key, and the access token, where the authorization communications key is used to indicate that the authentication server has permission to obtain the information from the open social platform, an authentication unit 403 configured to perform identity authentication on the user terminal using the user identity information to obtain an authentication result, and a sending unit 404 configured to return a portal authentication response to the portal server, where the portal authentication response includes the terminal identifier and the authentication result.

The portal authentication request is a RADIUS packet, where a user name attribute of the RADIUS packet is the terminal identifier, and a password attribute of the RADIUS packet is the access token.

Optionally, the receiving unit 401 is further configured to receive the authorization communications key sent by the portal server.

Figure 5:
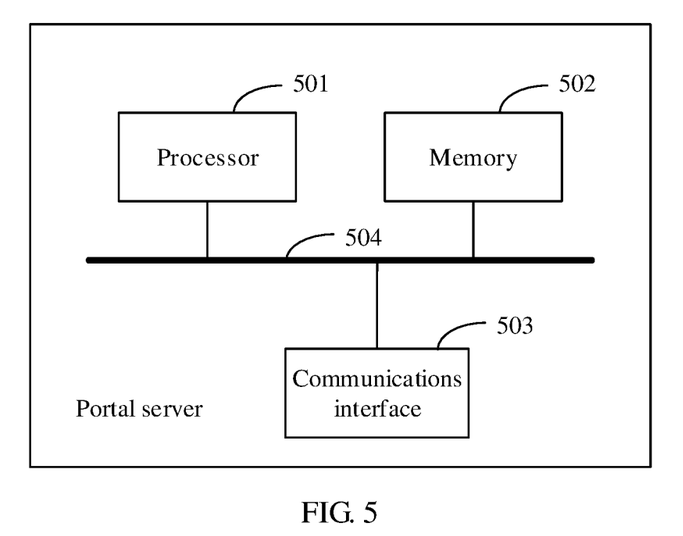
FIG. 5 is a schematic structural diagram of an embodiment of a portal server according to this application.

Referring to FIG. 5, FIG. 5 is a schematic structural diagram of an embodiment of a portal server according to this application. As shown in FIG. 5, the portal server may include components, such as a processor 501, a memory 502, and a communications interface 503.

The processor 501, the memory 502, and the communications interface 503 are connected to each other using a bus 504. The bus 504 may be a peripheral component interconnect (PCI) bus, an extended industry standard architecture (EISA) bus, or the like. The bus 504 may be an address bus, a data bus, a control bus, or the like. For ease of representation, in FIG. 5, only one thick line is used to represent the bus, but it does not indicate that there is only one bus or only one type of bus.

The processor 501 may be a central processing unit (CPU), a network processor (NP), or a combination of the CPU and the NP. The processor 501 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

In a specific implementation of this application, the memory 502 may include a volatile memory, such as a random access memory (RAM), or may include a non-volatile memory, such as a flash memory, a hard disk drive (HDD), or a solid-state drive (SSD). Alternatively, the memory 502 may include a combination of memories of the foregoing types. In this embodiment of the present disclosure, the memory 502 is configured to store a portal authentication page.

The communications interface 503 is configured to communicate with another device. The communications interface 503 may be a wired communications interface, a wireless communications interface, or a combination thereof. The wired communications interface, for example, may be an Ethernet interface. The Ethernet interface may be an optical interface, an electrical interface, or a combination thereof. The wireless communications interface may be a wireless local area network (WLAN) interface, a cellular network communications interface, a combination thereof, or the like.

In this embodiment of the present disclosure, the processor 501 is configured to receive a network access request from a user terminal using the communications interface 503, where the network access request includes a terminal identifier of the user terminal, return the portal authentication page to the user terminal using the communications interface 503, where the portal authentication page includes indication information, and the indication information is used to instruct the user terminal to log in to an open social platform, receive, using the communications interface 503, an access token that is generated by the open social platform and used to obtain user identity information, generate a portal authentication request including the terminal identifier of the user terminal and the access token, send the portal authentication request to an authentication server using the communications interface 503 such that the authentication server obtains the user identity information from the open social platform according to the terminal identifier and the access token, and performs user identification using the user identity information, and receive, using the communications interface 503, a portal authentication response returned by the authentication server, where the portal authentication response includes the terminal identifier and an authentication result.

Optionally, the processor 501 is further configured to obtain an authorization communications key from the open social platform using the communications interface 503. The authorization communications key is used to permit the authentication server to access the information stored on the open social platform. The authorization communications key is sent to the authentication server using the communications interface 503.

Optionally, the memory 502 is further configured to store a software program. The processor 501 performs one or more steps, or an optional implementation in the embodiment shown in FIG. 2 by operating a software program stored in the memory 502 such that the portal server implements a function of behavior of the portal server in the foregoing method.

Figure 6:
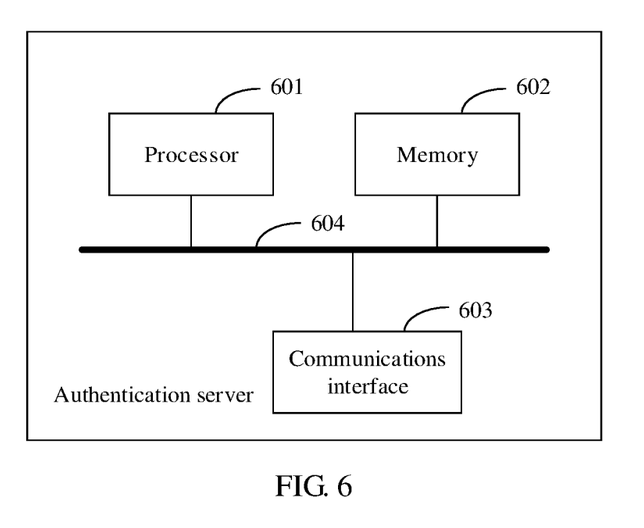
FIG. 6 is a schematic structural diagram of an embodiment of an authentication server according to this application.

Referring to FIG. 6, FIG. 6 is a schematic structural diagram of an embodiment of an authentication server according to this application. As shown in FIG. 6, the authentication server may include components such as a processor 601, a memory 602, and a communications interface 603.

The processor 601, the memory 602, and the communications interface 603 are connected to each other using a bus 604. The bus 604 may be a PCI bus, an EISA bus, or the like. The bus 604 may be an address bus, a data bus, a control bus, or the like. For ease of representation, in FIG. 6, only one thick line is used to represent the bus, but it does not indicate that there is only one bus or only one type of bus.

The processor 601 may be a CPU, an NP, or a combination of the CPU and the NP. The processor 601 may further include a hardware chip. The foregoing hardware chip may be an ASIC, a PLD, or a combination thereof. The foregoing PLD may be a CPLD, an FPGA, a GAL, or any combination thereof.

In a specific implementation of this application, the memory 602 may include a volatile memory, such as a RAM, or may include a non-volatile memory, such as a flash memory, an HDD, or an SSD. Alternatively, the memory 602 may include a combination of memories of the foregoing types. In this embodiment of the present disclosure, the memory 602 is configured to store an authorization communications key, and the like.

The communications interface 603 is configured to communicate with another device. The communications interface 603 may be a wired communications interface, a wireless communications interface, or a combination thereof. The wired communications interface, for example, may be an Ethernet interface. The Ethernet interface may be an optical interface, an electrical interface, or a combination thereof. The wireless communications interface may be a WLAN interface, a cellular network communications interface, a combination thereof, or the like.

In this embodiment of the present disclosure, the processor 601 is configured to receive, using the communications interface 603, a portal authentication request sent by a portal server, where the portal authentication request includes a terminal identifier of a user terminal and an access token, and the access token is used to indicate that the authentication server has permission to obtain, from an open social platform, user identity information corresponding to the terminal identifier of the terminal, obtain the user identity information of the user terminal from the open social platform using the communications interface 603 according to the terminal identifier, the authorization communications key, and the access token, where the authorization communications key is used to indicate that the authentication server has permission to obtain the information from the open social platform, perform identity authentication on the user terminal using the user identity information to obtain an authentication result, and return a portal authentication response to the portal server using the communications interface 603, where the portal authentication response includes the terminal identifier and the authentication result.

Optionally, the memory 602 is further configured to store a software program. The processor 601 performs one or more steps, or an optional implementation in the embodiment shown in FIG. 2 by operating a software program stored in the memory 602 such that the authentication server performs a function of behavior of the authentication server in the foregoing method.

A person skilled in the art may clearly understand that, the technologies in the embodiments of this application may be implemented by software in addition to a necessary general hardware platform. Based on such an understanding, the technical solutions in the embodiments of this application essentially or the part contributing to other approaches may be implemented in a form of a software product. The software product may be stored in a storage medium, such as a read only memory (ROM), a RAM, a magnetic disk, an optical disc, or the like, and include several instructions for instructing a computer device (which may be a personal computer, a server, a network device, or the like) to perform the methods described in the embodiments or some parts of the embodiments of this application.

The embodiments in this specification are described in a progressive manner. Refer to each other for same and similar parts among the embodiments. Especially, a system embodiment is basically similar to a method embodiment and an apparatus embodiment, and therefore is described briefly. For related parts, refer to partial descriptions in the method embodiment. The foregoing descriptions are implementations of this application, but are not intended to limit the protection scope of this application.

What is claimed is:

1. An identity authentication method, comprising:
    receiving, by a portal server, a network access request from a user terminal, wherein the network access request comprises a terminal identifier of the user terminal;
    returning, by the portal server, a portal authentication page to the user terminal, wherein the portal authentication page comprises indication information, and wherein the indication information instructs the user terminal to log in to an open social platform;
    receiving, by the portal server from the open social platform in response to the user terminal logging in to the open social platform, an access token generated by the open social platform authorizing access to user identity information stored by the open social platform;
    generating, by the portal server, a portal authentication request comprising the terminal identifier and the access token;
    sending, by the portal server to an authentication server, the portal authentication request requesting the authentication server to obtain the user identity information from the open social platform and to perform user identification using the user identity information; and
    receiving, by the portal server, a portal authentication response from the authentication server, wherein the portal authentication response comprises the terminal identifier and an authentication result.

2. The identity authentication method of claim 1, wherein the portal authentication request comprises a Remote Authentication Dial In User Service (RADIUS) packet, a user name attribute of the RADIUS packet comprising the terminal identifier, and a password attribute of the RADIUS packet comprising the access token.

3. The identity authentication method of claim 1, wherein before receiving the network access request from the user terminal, the method further comprises:
    obtaining, by the portal server, an authorization communications key from the open social platform, wherein the authorization communications key authorizes the authentication server to obtain the user identity information from the open social platform; and
    sending, by the portal server, the authorization communications key to the authentication server.

4. The identity authentication method of claim 1, wherein sending the portal authentication request to the authentication server comprises sending, by the portal server, the portal authentication request to a network access device (NAD) to transmit the portal authentication request to the authentication server, and wherein the user terminal accesses a network through the NAD.

5. The identity authentication method of claim 1, wherein the indication information further instructs the user terminal to log in to the open social platform by inputting a user name and a password.

6. The identity authentication method of claim 1, wherein the user terminal does not need to register with the authentication server to access a network.

7. An identity authentication method, comprising:
    receiving, by an authentication server from a portal server, a portal authentication request comprising a terminal identifier of a user terminal and an access token generated by an open social platform;
    obtaining, by the authentication server, user identity information of the user terminal from the open social platform according to the terminal identifier, an authorization communications key, and the access token, wherein the authorization communications key indicates that the authentication server has permission to obtain the user identity information from the open social platform;
    performing, by the authentication server, identity authentication on the user terminal using the user identity information to obtain an authentication result; and
    returning, by the authentication server, a portal authentication response to the portal server comprising the terminal identifier and the authentication result.

8. The identity authentication method of claim 7, wherein the portal authentication request comprises a Remote Authentication Dial In User Service (RADIUS) packet, a user name attribute of the RADIUS packet comprising the terminal identifier, and a password attribute of the RADIUS packet comprising the access token.

9. The identity authentication method of claim 7, wherein before receiving the portal authentication request from the portal server, the method further comprises receiving, by the authentication server, the authorization communications key from the portal server.

10. The identity authentication method of claim 7, wherein the portal authentication request comprises the authorization communications key.

11. The identity authentication method of claim 7, wherein before receiving the portal authentication request from the portal server, the method further comprises obtaining, by the authentication server, the authorization communications key from the open social platform.

12. The identity authentication method of claim 7, wherein obtaining the user identity information from the open social platform comprises obtaining, by the authentication server according to Open Authorization (oAuth) protocol, the user identity information stored on the open social platform.

13. A portal server, comprising:
a hardware communications interface;
a non-transitory computer-readable memory coupled to the hardware communications interface and configured to store a portal authentication page; and
a computer processor coupled to the hardware communications interface and the non-transitory computer-readable memory and configured to:
receive a network access request from a user terminal through the hardware communications interface, wherein the network access request comprises a terminal identifier of the user terminal;
return the portal authentication page to the user terminal through the hardware communications interface, wherein the portal authentication page comprises indication information, and wherein the indication information instructs the user terminal to log in to an open social platform;
receive, from the open social platform in response to the user terminal logging in to the open social platform, an access token generated by the open social platform authorizing access to user identity information stored by the open social platform;
generate a portal authentication request comprising the terminal identifier and the access token;
send, to an authentication server through the hardware communications interface, the portal authentication request requesting the authentication server to obtain the user identity information from the open social platform and to perform user identification using the user identity information; and
receive a portal authentication response from the authentication server, wherein the portal authentication response comprises the terminal identifier and an authentication result.

14. The portal server of claim 13, wherein the computer processor is further configured to:
obtain an authorization communications key from the open social platform, wherein the authorization communications key authorizes the authentication server to obtain the user identity information from the open social platform; and
send the authorization communications key to the authentication server before receiving the network access request from the user terminal.

15. The portal server of claim 13, wherein the computer processor is further configured to send the portal authentication request to a network access device (NAD) to transmit the portal authentication request to the authentication server, and wherein the user terminal accesses a network through the NAD.

16. An authentication server, comprising:
a hardware communications interface;
a non-transitory computer-readable memory coupled to the hardware communications interface and configured to store an authorization communications key; and
a computer processor coupled to the hardware communications interface and the non-transitory computer-readable memory and configured to:
receive through the hardware communications interface, a portal authentication request from a portal server, wherein the portal authentication request comprises a terminal identifier of a user terminal and an access token generated by an open social platform;
obtain user identity information of the user terminal from the open social platform according to the terminal identifier, the authorization communications key, and the access token, wherein the authorization communications key indicates that the authentication server has permission to obtain the user identity information from the open social platform;
perform identity authentication on the user terminal using the user identity information to obtain an authentication result; and
return a portal authentication response to the portal server through the hardware communications interface, wherein the portal authentication response comprises the terminal identifier and the authentication result.

17. The authentication server of claim 16, wherein the computer processor is further configured to receive the authorization communications key from the portal server before receiving the portal authentication request from the portal server.

18. The authentication server of claim 16, wherein the portal authentication request comprises the authorization communications key.

19. The authentication server of claim 16, wherein the computer processor is further configured to obtain the authorization communications key from the open social platform before receiving the portal authentication request from the portal server.

20. The authentication server of claim 16, wherein the computer processor is further configured to obtain, according to Open Authorization (oAuth) protocol, the user identity information stored on the open social platform.

* * * * *